US012620073B2

(12) United States Patent
Wang et al.

(10) Patent No.: US 12,620,073 B2
(45) Date of Patent: May 5, 2026

(54) IMAGE RECOGNITION METHOD, SYSTEM AND MOBILE VEHICLE

(71) Applicant: WHETRON ELECTRONICS CO., LTD., New Taipei City (TW)

(72) Inventors: Ming-Chen Wang, New Taipei City (TW); Yu-Ting Li, New Taipei City (TW); Shao-Yuan Lin, New Taipei City (TW); Jia-Lin Lee, New Taipei City (TW); Guan-Yi Wu, New Taipei City (TW)

(73) Assignee: WHETRON ELECTRONICS CO., LTD., New Taipei City (TW)

( * ) Notice: Subject to any disclaimer, the term of this patent is extended or adjusted under 35 U.S.C. 154(b) by 331 days.

(21) Appl. No.: 18/380,365

(22) Filed: Oct. 16, 2023

(65) Prior Publication Data

US 2024/0273695 A1 Aug. 15, 2024

(30) Foreign Application Priority Data

Feb. 10, 2023 (TW) ................................. 112104830

(51) Int. Cl.
G06T 7/00 (2017.01)
G05D 1/00 (2024.01)

(52) U.S. Cl.
CPC .............. G06T 7/00 (2013.01); G05D 1/021 (2013.01)

(58) Field of Classification Search
None
See application file for complete search history.

(56) References Cited

U.S. PATENT DOCUMENTS

| | | | |
|---|---|---|---|
| 2003/0138132 A1* | 7/2003 | Stam | B60Q 1/085 |
| | | | 382/104 |
| 2007/0152804 A1* | 7/2007 | Breed | G08G 1/096783 |
| | | | 701/301 |
| 2009/0010494 A1* | 1/2009 | Bechtel | G01S 11/12 |
| | | | 382/104 |
| 2012/0116632 A1* | 5/2012 | Bechtel | H04N 25/443 |
| | | | 701/1 |
| 2014/0104051 A1* | 4/2014 | Breed | G06V 20/56 |
| | | | 340/435 |
| 2022/0041105 A1* | 2/2022 | Jochmann | G06V 10/243 |
| 2022/0058411 A1* | 2/2022 | Hanada | H04N 23/555 |
| 2022/0324328 A1* | 10/2022 | Kato | B60K 35/285 |
| 2024/0087222 A1* | 3/2024 | Li | G06V 10/44 |

OTHER PUBLICATIONS

Prasetyo et al., "Adaptive Cars Headlamps System with Image Processing and Lighting Angle Control," Jan. 2016, Lecture Notes in Electrical Engineering 365:415-422, DOI:10.1007/978-981-287-988-2_45 (Year: 2016).*

(Continued)

*Primary Examiner* — Soo Shin
(74) *Attorney, Agent, or Firm* — WPAT, PC

(57) ABSTRACT

An image recognition method includes the steps of: receiving a captured image; acquiring a focusing zone image from a portion of the captured image; processing the captured image and/or the focusing zone image and then making the two images into a batch of image information; and executing an image analysis procedure on the batch of image information to generate an analysis result.

13 Claims, 5 Drawing Sheets

(56) References Cited

OTHER PUBLICATIONS

Akinsanmi et al., "Design and Development of an Automatic Automobile Headlight Switching System," International Journal of Engineering and Applied Sciences (IJEAS), ISSN: 2394-3661, vol. 2, Issue-8, Aug. 2015 (Year: 2015).*

Bevilacqua et al., "An Automatic System for the Real-Time Characterization of Vehicle Headlamp Beams Exploiting Image Analysis," 2630 IEEE Transactions On Instrumentation and Measurement, vol. 59, No. 10, Oct. 2010 (Year: 2020).*

Yang et al., "The Design of Vehicle Headlights Switching System Based on Support Vector Machine(SVM)," 2018 IEEE 3rd Advanced Information Technology, Electronic and Automation Control Conference(IAEAC 2018) (Year: 2018).*

* cited by examiner

IMAGE RECOGNITION METHOD, SYSTEM AND MOBILE VEHICLE

CROSS REFERENCE TO RELATED APPLICATION

The application claims the benefit of Taiwan application serial No. 112104830, filed on Feb. 10, 2023, and the entire contents of which are incorporated herein by reference.

BACKGROUND OF THE INVENTION

1. Field of the Invention

The present invention relates to a recognition method and, more particularly, to an image recognition method system and a mobile vehicle.

2. Description of the Related Art

With the development of image recognition technologies, image recognition has gradually been applied to various fields. It can be especially applied to vehicle driving, to instantly recognize a driving scene/driving situation, serving as decision-making reference for a driver. However, in addition to the problem that presentation of real-time-inferenced information is unclear or puzzling in conventional image recognition methods/systems, there are also problems of time-consuming computing or unrecognizability for a zone that should be highly focused in the driving scene/driving situation.

In light of the foregoing, it is necessary to improve the conventional image recognition technology.

SUMMARY OF THE INVENTION

In order to solve the above problems, it is an objective of the present invention to provide an image recognition method, which can improve the preciseness of scene/situation recognition.

It is another objective of the present invention to provide an image recognition method, which can enhance the clarity and comprehensibility of presentation of real-time information.

It is yet another objective of the present invention to provide an image recognition system, which can improve the preciseness of scene/situation recognition and improve computing efficiency.

It is still another objective of the present invention to provide an image recognition system, which can enhance the clarity and comprehensibility of presentation of real-time information.

It is a further objective of the present invention to provide a mobile vehicle, which can improve driving safety.

As used herein, the term "one", "a" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, terms "engaged", "combined", "assembled" or "arranged" throughout the present invention mainly include patterns that the components can still be separated without destroying the components after connection, or the components are inseparable after connection and the like, which can be selected by a person having ordinary skill in the art based on the material or assembly requirements of the components to be connected.

As used herein, the term "coupled" throughout the present invention includes direct or indirect electrical and/or signal connections, which can be selected by a person having ordinary skill in the art based on actual needs.

As used herein, the term "narrative logic" throughout the present invention is, for example, implemented based on a natural language processing (NLP) technology, and the natural language processing technology is understandable to a person having ordinary skill in the art.

As used herein, terms "image recognition system", "smart lamp" and "mobile vehicle" throughout the present invention include at least one "processor" to perform corresponding flows and functions. In detail, the processor refers to various data processing devices, such as an electronic controller, a server, a cloud platform, a virtual machine, a desktop computer, a notebook computer, a tablet, or a smart phone, that have particular functions and are implemented in hardware or hardware and software, to process or analysis information and/or generate corresponding control information, which can be understood by a person having ordinary skill in the art. In addition, a corresponding data receiving or transmitting unit may be included to receive or transmit required data. In addition, a corresponding database/storage unit (especially a non-transitory computer-readable medium) may be included to store the required data. In particular, unless otherwise specifically excluded or contradicted, the processor may be a collection of multiple processors in an architecture based on a distributed system, which is used for including/representing processes, mechanisms, and results of information stream processing among the multiple processors. Furthermore, the "processor" used in the present invention may represent an integrated technical feature, which may be a case that a single processor is coupled to control one or more coupled devices in an integrated manner, or multiple processors individually control respective coupled devices, such that corresponding devices perform their functions under suitable conditions.

An image recognition method of the present invention includes the following steps: receiving an captured image; acquiring a focusing zone image from a portion of the captured image; processing the captured image and/or the focusing zone image; making the captured image and the focusing zone image into a batch of image information; and executing an image analysis procedure on the batch of image information to generate an analysis result. In the image analysis procedure, the captured image and the focusing zone image of the batch of image information are respectively analyzed to get a respective analyzed result, and then the respective analyzed result from the captured image and the respective analyzed result from the focusing zone image are combined to generate the analysis result.

Accordingly, the image recognition method of the present invention can improve or ensure a higher recognition rate of the focusing zone image in a subsequent image analysis procedure by acquiring the focusing zone image and making the focusing zone image and the extracted image into the processed batch of image information, especially said effects are contributed by the mechanism that the focusing zone image retain the original resolution from the captured image.

In an example, the image analysis procedure is performed by using both or one of an image caption model and an object detection model. Thus, whether there are features in the batch of image information can be recognized by the image analysis procedure.

In an example, in a state that the image analysis procedure is performed by using the image caption model, multiple batches of image information are analyzed to generate the analysis result. Thus, through using the multiple batches of image information, the recognition of a special scene/situation is facilitated, achieving an effect of precise recognition.

In an example, an original pixel dimension of the focusing zone image is 10 to 50 percent of an original pixel dimension of the captured image. Thus, the resolution of the focusing zone image can be retained by appropriately defining the original pixel dimension of the focusing zone image. In addition, through enabling the focusing zone image to have an appropriate size, it can be ensured that the focusing zone image satisfy the limitation of a resource-constrained device with maximum information retained for image recognition, such that the image recognition has higher computing efficiency.

An image recognition system of the present invention includes: an image capture unit configured to capture a captured image; and an image processing unit configured to perform the aforementioned image recognition method to generate an analysis result.

Accordingly, the image recognition system of the present invention can achieve the effect of improving or ensuring a higher precision and/or recall of the focusing zone image in the subsequent image analysis procedure by acquiring the focusing zone image and making the focusing zone image and the extracted image into the processed batch of image information, and has an effect corresponding to the aforementioned image recognition method.

A smart lamp of the present invention includes: a lamp having multiple switchable light modes; and a lamp control module coupled with the aforementioned image recognition system to receive the analysis result. The lamp control module has a lamp control logic to switch the multiple switchable light modes according to the analysis result.

Accordingly, through the fact that the above-mentioned image recognition system can have a better image recognition result for the focusing zone image, the smart lamp of the present invention is ensured to be more accurately controlled to have a corresponding vehicle light mode in response to a current driving scene/driving situation.

In an example, the lamp control logic further includes a learning mechanism, which automatically adjusts the lamp control logic according to the habits of a user. Thus, through the learning mechanism, driving experience can be improved.

In an example, the learning mechanism includes: in a state that the light mode manually adjusted by the user in a particular scene or situation is different from a corresponding light mode in the lamp control logic, and in a state that a consecutive manual adjustment to the same light mode reaches a particular number of times, the light mode in the lamp control logic corresponding to the particular scene or situation is replaced with the light mode manually adjusted by the user. Thus, through the learning mechanism, switching of vehicle lights according to the habits of a driver in the particular scene/situation can be applied, thereby improving the driving experience.

A mobile vehicle of the present invention includes a power system configured to drive the mobile vehicle. The image recognition system as described above is further included and coupled to the mobile vehicle, or the smart lamp as described above is further included, and the lamp is mounted on a head side of the mobile vehicle in a travel direction thereof.

Accordingly, the mobile vehicle of the present invention can improve the control of the driver over the driving scene/driving situation by combining the above-mentioned image recognition system with the mobile vehicle; or can improve driving safety and convenience by combining the above-mentioned smart lamp with the mobile vehicle and by making corresponding lamp control through the smart lamp according to the driving scene/driving situation.

In an example, the mobile vehicle is any of a car, a boat and an aircraft. Thus, since the mobile vehicle has an effect of being capable of recognizing scenes/situations and can be widely suitable for various types of transportation, the driving safety and convenience of various types of transportation can be improved.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
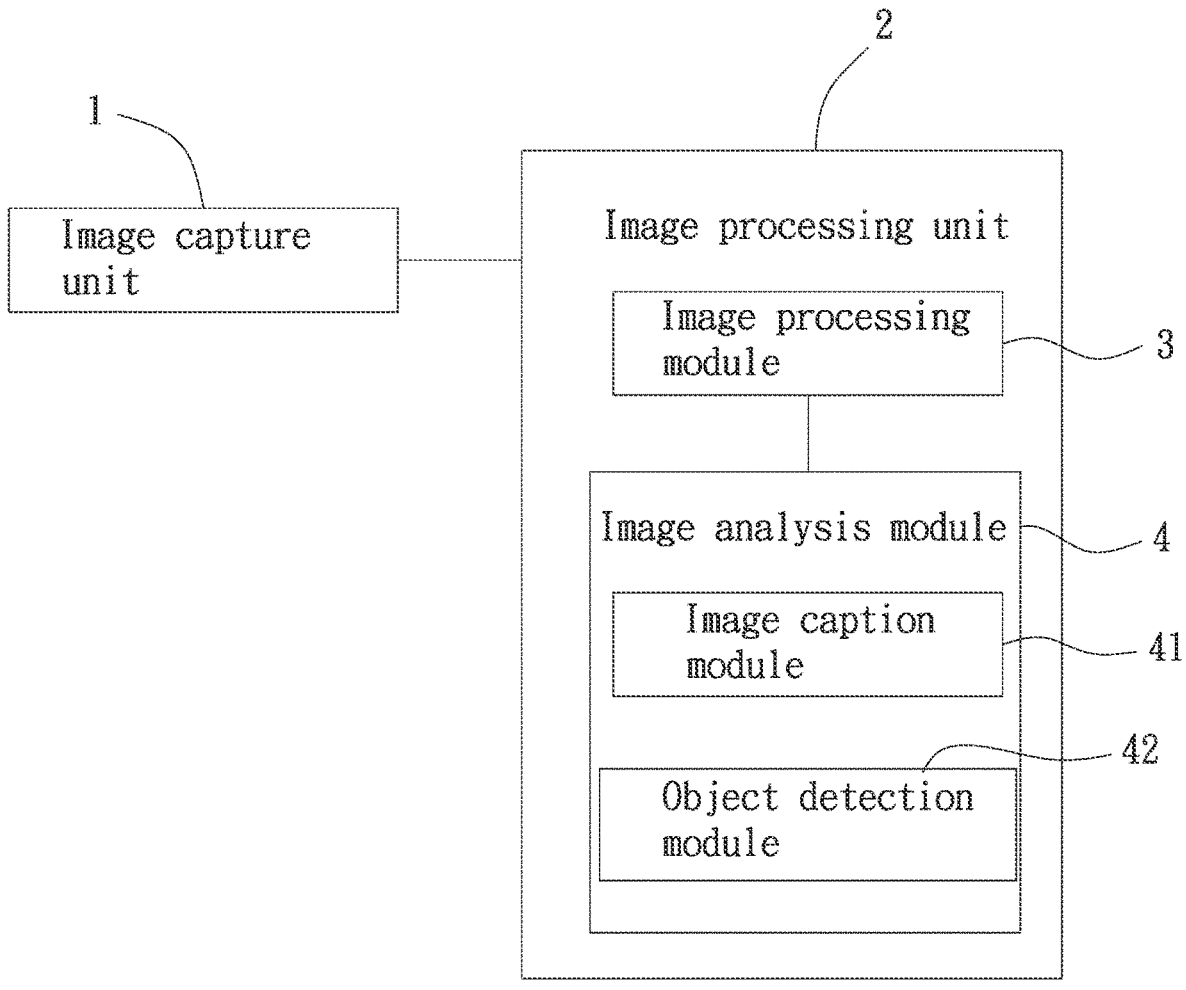
FIG. 1 is a system architecture diagram of a preferred embodiment of an image recognition system of the present invention.

In the various figures of the drawings, the same numerals designate the same or similar parts, and the description thereof will be omitted. Furthermore, when the terms "front", "rear", "left", "right", "up (top)", "down (bottom)", "inner", "outer", "side", and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Referring to FIG. 1, which shows a preferred embodiment of an image recognition system of the present invention. An image capture unit 1 is coupled with an image processing unit 2 to receive, via the image processing unit 2, an image captured by the image capture unit 1 for corresponding image processing and generate a corresponding analysis result.

The image capture unit 1 is a device that can be used for photo shooting or photographing, and especially can be used for generating multiple consecutive frames of images, so as to capture at least one captured image. It should be noted that functions of the image capture unit 1 are achieved by relevant technologies of an imaging principle, which is widely used in the art, and the descriptions are hereby omitted.

The image processing unit 2 is coupled with the image capture unit 1 to receive the captured image. The image processing unit 2 includes an image processing module 3 and can further include an image analysis module 4. The image processing module 3 is configured to perform corresponding image processing on the received captured image to form processed image information, and then the processed image information is received by the image analysis module 4 to generate/output the corresponding analysis result.

Figure 2:
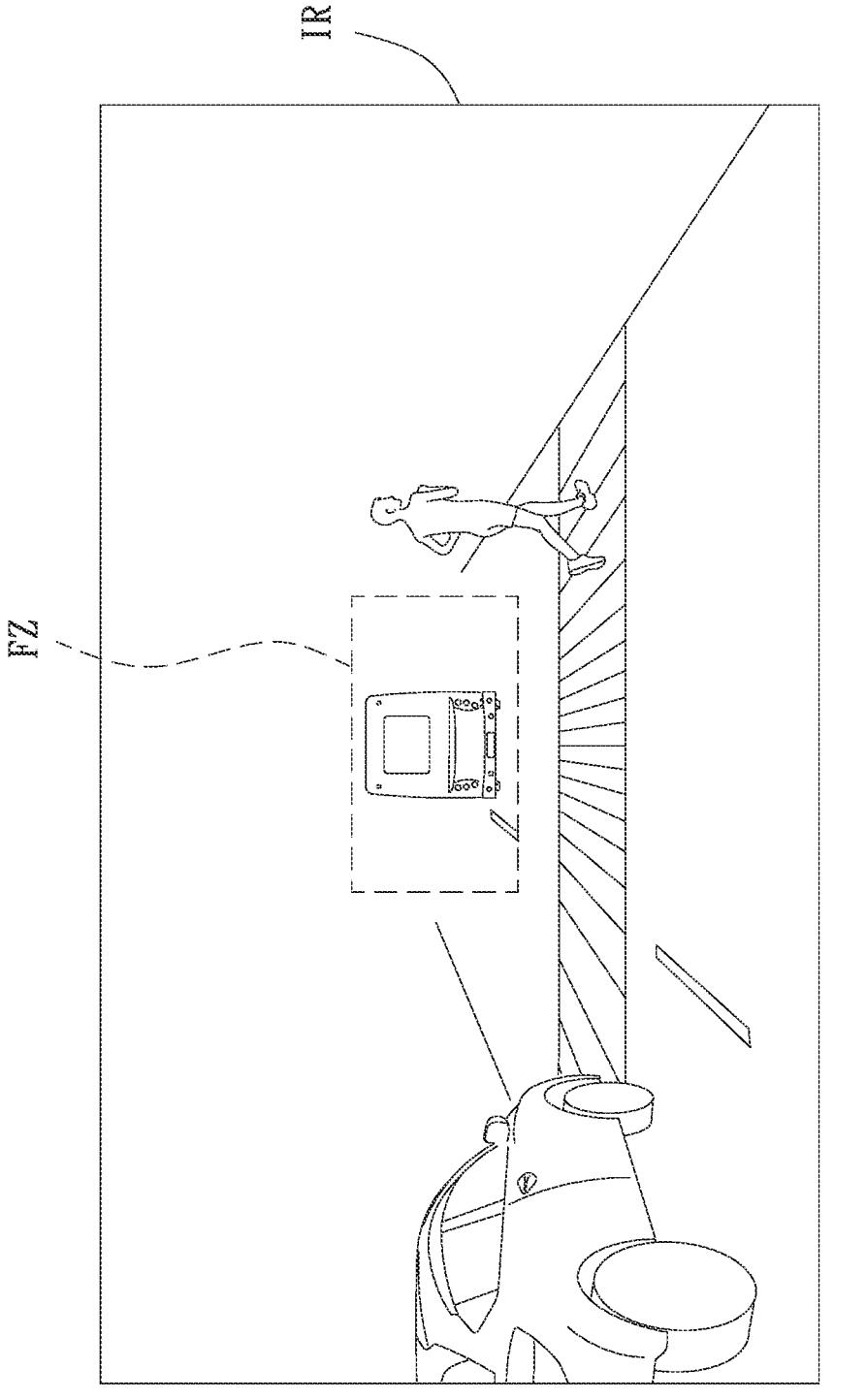
FIG. 2 is a schematic diagram of a captured image and a focusing zone image by taking a vehicle as a mobile vehicle as an example.

Referring to FIG. 2, which shows an image range IR of an captured image captured by the image capture unit 1 when a mobile vehicle is running, and at least one focusing zone FZ is predetermined within the image range IR. The at least one focusing zone FZ can be defined according to actual needs (such as a key point of subsequent image recognition, namely an object or event of interest). It should be noted that the mobile vehicle refers to a type of transportation, and is not limited to any carriers such as a land carrier, an underground carrier, a water surface carrier, an underwater carrier and an airborne carrier. However, for convenience of illustration, FIG. 2 takes a scene/situation that a vehicle runs on the land as an example.

Figure 3:
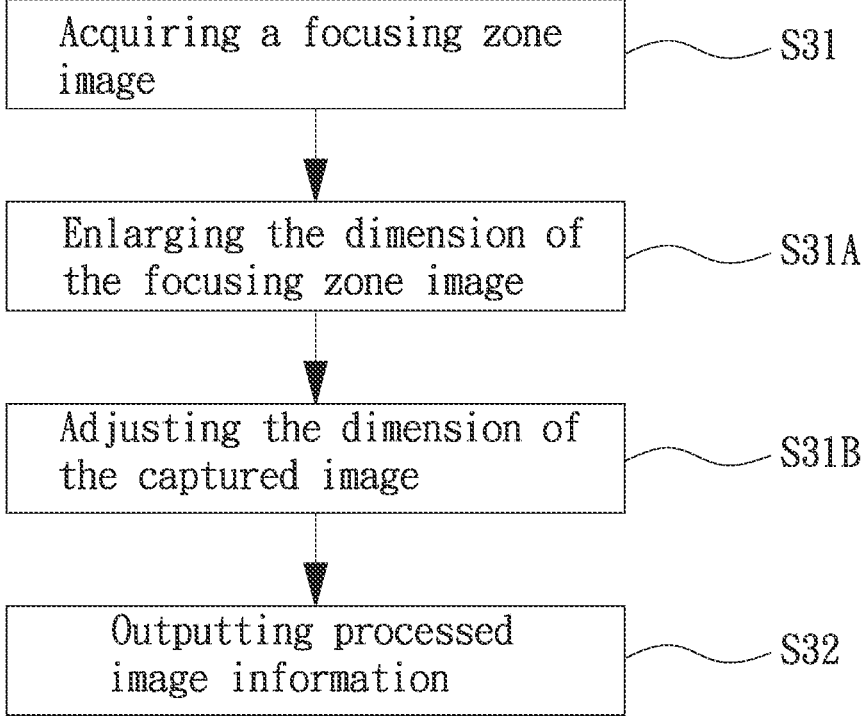
FIG. 3 is a schematic diagram of an image processing flow of the present invention.

Specifically, as shown in FIG. 3, the image processing module 3 performs an image processing flow after receiving an captured image, including the following step S31, optional additional step S31A, optional additional step S31B and step S32.

Step S31: Acquiring a focusing zone image.

At least one focusing zone image is acquired from a portion of the captured image. Specifically, the captured image has an image range IR that corresponds to an image pixel dimension thereof, and the focusing zone image has a focusing zone FZ that corresponds to an image pixel dimension thereof. The original image pixel dimension of the focusing zone FZ is not greater than that of the image range IR. Preferably, the original image pixel dimension of the focusing zone FZ is 0.1 to 0.5 times (10 to 50 percent of) the original image pixel dimension of the image range IR. Taking the original image pixel dimension of the image range IR being 1920×1080 pixels as an example, the original image pixel dimension of the focusing zone FZ is 192×108 pixels to 960×540 pixels. More preferably, the original image pixel dimension of the focusing zone FZ is 0.2 to 0.3 times (20 to 30 percent of) the original image pixel dimension of the image range IR. Taking the original image pixel dimension of the image range IR being 1920×1080 pixels as an example, the original image pixel dimension of the focusing zone FZ is 384×216 pixels to 576×324 pixels. In other words, since the focusing zone image is acquired from a partial region of the captured image, the image size (image pixel dimension) of the focusing zone image is smaller than the image size (image pixel dimension) of the captured size, and the resolution of the focusing zone image is the same with the resolution of the captured image.

Optional additional step S31A: Enlarging the dimension of the focusing zone image.

In the present invention, it is verified by experiments that moderately enlarging the original image pixel dimension of the focusing zone image will enhance the recognition accuracy of the focusing zone image in a subsequent object detection operation, especially ensure that both the length and width of an recognizable object are not less than a minimum recognizable resolution threshold (e.g., 15 pixels, but the present invention is not limited thereto). The minimum recognizable resolution threshold refers to a minimum resolution necessary for the resolution of any object feature to be recognized by a corresponding image analysis module/model in an object detection operation. In other words, when the focusing zone image has an object feature to be recognized, but if the resolution is insufficient (the resolution is less than the minimum recognizable resolution threshold)

before enlarging, the object feature will not be recognized by the subsequent image recognition operation. Preferably, the original image pixel dimension of the focusing zone image can be enlarged by 1.1 times or above. More preferably, the original image pixel dimension of the focusing zone image can be enlarged by 1.25 to 1.87 times. In particular, an upper limit value of an enlargement factor of the original image pixel dimension is verified by the research of the present invention. When the upper limit value of the enlargement factor is not more than 1.87 times, the recognition accuracy can be retained in a considerable good level and is ensured to avoid from the deterioration effect that the recognition accuracy is reduced (false prediction is increased) due to the fact that the over enlarged image, enlarged over said upper limit value, is too blurry (low resolution) to be recognize.

Optional additional step S31B: Adjusting the dimension of the captured image.

In the field of image recognition technologies, according to current computer/processor performance, the computing amount of the recognition model can be reduced by moderately shrinking the original image pixel dimension of the image to be recognized, thereby enhancing the efficiency of the subsequent image recognition operation. However, with the development of the computer performance or algorithm technology, it is not excluded that the original image pixel dimension of the captured image can be enlarged to achieve a more refined image recognition operation. Preferably, the original image pixel dimension of the captured image can be shrunk to 0.1 to 0.5 times. More preferably, the original image pixel dimension of the captured image can be shrunk to 0.2 to 0.4 times.

Step S32: Outputting processed image information.

In detail, the processed image information includes the above-mentioned captured image and the above-mentioned focusing zone image. For example, the captured image and the focusing zone image can be formed into a batch of image information to serve as an output, and preferably be transmitted to the image analysis module 4. The captured image may have the original image pixel dimension (acquired by the image capture unit 1) or a shrunk pixel dimension (corresponding to step S31B), and the focusing zone image may have the original image pixel dimension (corresponding to step S31) or an enlarged pixel dimension (corresponding to step S31A). Preferably, at least one of step S31A and step S31B mentioned above will be performed. That is, after the captured image is optionally processed according to step S31B and/or after the focusing zone image is optionally processed according to step S31A, the captured image and the focusing zone image are made into a batch of image information (corresponding to step S32).

Preferably, the processed image information includes a shrunk captured image and an enlarged or non-enlarged focusing zone image. As such, the computing efficiency of subsequent recognition can be increased by shrinking the captured image. In addition, since the original image resolution of the focusing zone image can be retained or moderately enlarged, the accuracy of the subsequent recognition can be improved. Furthermore, based on applying the processed image information (the batch of image information), the undesired effect caused by using only the shrunk captured image can be avoided; wherein, in the state of only using the shrunk captured image to generate the analysis result, since the resolution of the portion of the shrunk captured image corresponding to the focusing zone FZ/focusing zone image is reduced or is too low, leading to a case that the object feature cannot be recognized successfully in the analysis result even if the corresponding focusing zone FZ actually has the corresponding to-be-recognized object feature.

Preferably, the processed image information includes the captured image with the original dimension and the enlarged focusing zone image. As such, the accuracy of the subsequent recognition can be increased by retaining the original resolution of the captured image. In addition, the accuracy of the subsequent recognition can be further increased by moderately enlarging the original image resolution of the focusing zone image. Furthermore, the burden of the subsequent recognition can be avoided as much as possible by only enlarging the focusing zone image (rather than enlarging the entire captured image).

In a specific example, the original dimension of the captured image is 1920×1080 pixels. Through step S31 described above, it can be obtained that the original dimension of the corresponding focusing zone image is 384×216 pixels. Through step S31A described above, the focusing zone image is enlarged to 1.25 times to be 480×270 pixels. Through step S31B described above, the captured image is shrunk to 0.25 times to be 480×270 pixels. Next, the processed image information formed by the shrunk captured image and the enlarged focusing zone image is transmitted into the image analysis module 4. Preferably, in the image information transmitted into the image analysis module 4, the adjusted pixel dimension of the captured image may be consistent with that of the focusing zone image.

Conventionally, in a general image recognition method/ system, image recognition is performed using an object with a respective analyzed result of the focusing zone image. The above-mentioned merging operation can be implemented by information about the position of the focusing zone image corresponding to the captured image. It is worth mentioning that if the captured image acquired by the image capture unit 1 is directly transmitted to the image analysis module 4 (at least including the image caption module 41) for image recognition without an image processing flow performed by the image processing module 3, the conventional problem (without using an image caption module) that a driving environment cannot be recognized can also be solved. Furthermore, the focusing zone image acquired by the image processing module 3 is helpful for further improving the accuracy of scene/situation recognition.

The image caption module 41 is equipped with an image caption model that has been trained by an image caption technology. As for the training of the image caption model, after the processed image information is recognized by the corresponding image caption model based on a deep learning technology, with a large number of driving scene/driving situation images/photos with labeled features and corresponding text narrations by applying a computer vision technology and an NLP technology, corresponding features of interest (labeled features) can be recognized, and a corresponding driving scene/driving situation caption is generated based on a corresponding narrative logic. By way of examples, in the case that the mobile vehicle is, for example, a car, the features of interest trained by labels of the present invention may be exemplified as shown in Table 1 below, but are not limited thereto.

TABLE 1

| Features of Interest/Labeled Features of the Present Invention. | | | | | |
|---|---|---|---|---|---|
| Classification | Details | Classification | Details | Classification | Details |
| Object | Car | Road condition | Straight road | Ambient lighting | Bright |
| | Pedestrian | | Curve | | Dim |
| | Streetlight | | Slope | | Pitch-dark |
| | Vehicle headlight | | Intersection | Weather | Bright sunny |
| | Vehicle taillight | Site | Highway | | Rainy |
| | Lighting zone | | General road | | Sunny |
| Relative | Left side | | Gravel/bricks/earth road | | Cloudy |
| position | Center | | Grass pathway | | Thick fog |
| | Right side | | Top covered zone | | Snow |
| | Upward side | | | Time | Daytime |
| | Downward side | | | | Night | detection module, but relying solely on the object detection module, the general image recognition method/system only has a function of object detection. On the contrary, the present invention has the ability to process an abstract environmental state due to having a corresponding image caption module 41. In detail, the image analysis module 4 includes an image caption module 41 to receive the above-mentioned processed image information and correspondingly generate a first recognition result. Preferably, the image analysis module 4 further includes at least one object detection module 42 to receive the above-mentioned processed image information and correspondingly generate a second recognition result. The image analysis module 4 can combine the first recognition result with the second recognition result to generate a third recognition result.

In particular, for the recognition/analyzation of the above-mentioned processed image information, when the focusing zone image is recognized as having a complete particular object, an outputted corresponding result will combine/ merge a respective analyzed result of the captured image In detail, after receiving the processed image information, the image caption module 41 will recognize, for the captured image and the focusing zone image in the processed image information, whether there is an object that conforms to the classification in built-in features of interest/labeled features thereof and a corresponding relative position of the object, and a description of a relationship between the recognized object and a relative position thereof is generated based on a corresponding narrative logic, so as to form a corresponding driving scene/driving situation caption. As described above, the examples of the features of interest/labeled features of the present invention are described in Table 1, but are not limited thereto. For example, the mobile vehicle is a car and, optionally, the narrative logic includes at least contents of the car and pedestrian of the object in the features of interest and relative positions to a car body being driven, such that there is a caption of the relative position of the car or pedestrian to the car body being driven in the driving scene/driving situation caption correspondingly generated. Taking FIG. 2 as an example, since there are cars and pedestrians in the captured image, the relationship between the relative positions of the cars and pedestrians to the car body being driven will be described in the corresponding driving scene/driving situation caption. For example, the relationship may be described as "there is a car ahead on the left, there is a car right ahead, and there is a pedestrian ahead on the right". At this time, a data type of the corresponding first recognition result may be a type of [relative position, object]. For example, [ahead on the left, car], [right ahead, car], and [ahead on the right, pedestrian] are presented. In another example, if the narrative logic further includes road conditions, according to FIG. 2, the corresponding driving scene/driving situation caption is, for example, "on a straight road, there is a car ahead on the left, there is a car in the center, and there is a pedestrian ahead on the right". It should be noted that the above-mentioned driving scene/driving situation caption is only used for illustrative purposes to facilitate understanding of corresponding technical contents, and the present invention is not limited in this regard.

The object detection module 42 is equipped with an object detection model trained by an object detection/identification technology. The object detection technology is that based on a deep learning architecture and through flows of object localization and feature extraction, with a large number of graphics that conform to a target object to be recognized. Thus, the trained object detection model is made to establish a feature database of the target object to be recognized. Therefore, the trained object detection model may have a good recognition effect on the target object to be recognized/ an object of a particular type. As a result, the object detection model can be configured to recognize whether the processed image information has an object that conforms to the built-in features of the object to be recognized and coordinates thereof, so as to output information about the recognized object and corresponding coordinates thereof. The information about the target object to be recognized and the corresponding coordinates thereof can be defined as the features of interest to be recognized in the object detection module 42. In addition, optionally, based on a result outputted from the object detection module 42 (the recognized object and corresponding coordinates thereof), a narrative logic can be further applied to generate a description of the recognized object and a specific positional relationship thereof (obtained by coordinate conversion) to form the driving scene/ driving situation caption.

Also taking the case that the mobile vehicle is a car as shown in FIG. 2 as an example, information about various car coordinates and pedestrian coordinates can be obtained by using an object detection module 42 equipped with an recognition model that can recognize cars and pedestrians (at this time, the "cars" and "pedestrians" are the target objects to be recognized), or by using two object detection modules 42 each equipped with an recognition model that recognizes cars and an identification model that recognizes pedestrians, and a distance between each car and each pedestrian and the car body (mobile vehicle) being driven can be figured out from information such as perspective (image angle changes) and the original image dimension/ size. At this time, a data type of the corresponding second recognition result may be a type of [coordinates, identified object], for example, [(first x coordinate, first y coordinate), car], [(second x coordinate, second y coordinate), car], [(third x coordinate, third y coordinate), pedestrian] are presented.

At this time, if the image analysis module 4 is equipped with both the image caption module 41 and the object detection module 42, the image analysis module 4 may further have an information integration logic, such as an information conversion matching logic, so as to convert the x coordinate in the second recognition result to a relative position that conforms to the first recognition result, convert the y coordinate in the second recognition result to a distance from the car body being driven, and generate a third recognition result according to the consistent relative positions in the first recognition result and second recognition result and object information. The third recognition result may have a corresponding data type of [relative position, distance, object]. A corresponding driving scene/driving situation caption is, for example, "there is a car 1 meter ahead on the left, there is a car 10 meters right ahead, and there is a pedestrian 2 meters ahead on the right".

It should be noted that the data types of the first recognition result, the second recognition result and the third recognition result described above are mainly used for illustrating that the results generated by the image caption module 41 and the object detection module 42 can be matched, correlated and merged. Thus, the features of interest recognized by the image caption module 41 and the object detection module 42 that are actually the same can match each other, so as to correlate the distance between each object and the car body being driven, and form a more accurate driving scene/driving situation caption. Therefore, the results generated by the image caption module 41 and the object detection module 42 can be correlated and merged based on the above-mentioned manner. However, it should be noted that the data types of the first recognition result, the second recognition result, and the third recognition result are not limited to those listed in the present invention.

It should be noted that in another embodiment, the image analysis module 4 of the present invention can also be equipped with only one of the image caption module 41 and the object detection module 42 to receive the processed image information to generate the first recognition result or the second recognition result. In particular, the processed image information includes the aforementioned focusing zone image, which can further improve the recognition accuracy of either of the image caption module 41 and/or the object detection module 42 for the features of interest/target objects to be recognized.

In particular, the image caption module 41 used in the present invention may have a function of recognizing a lighting zone feature (corresponding to the feature of interest of the "lighting zone" shown in Table 1). The lighting zone feature refers to a zone (lighting zone) with brightness higher than the background that is formed by light emitted from any light source feature, and the lighting zone feature refers to that there is a lighting zone in a dark zone in multiple captured images (including the image range IR or focusing zone FZ), and the area of the lighting zone becomes larger in the multiple captured images obtained according to a time sequence. In correspondence to the above-mentioned case of lighting zone, an actual corresponding reality scene/ situation is night or a site with insufficient lighting, and in correspondence to a case that there is a sight obstruction ahead the carrier being driven. With the progress of the time sequence, at least one beam of bright light initially shines slightly from the sight obstruction to form a brighter lighting zone, and then the lighting zone formed by the at least one beam of bright light gradually becomes brighter and larger. By way of examples, the mobile vehicle is a car with the car body being driven running at night, and there is the other car ahead on the left or ahead on the right which is about to depart from the sight obstruction (such as an alley). As the other car gradually approaches the intersection of the alley, the lighting zone formed by the lights of the other car gradually becomes brighter and wider. Preferably, in correspondence to the above-mentioned case that a gradually bright light source generated by the other car over time from the sight obstruction is recognized, the focusing zone FZ is a zone in the image range IR that is prone to generate the gradually bright light source. The zone that is prone to generate the gradually bright light source can be defined statistically. For example, the zone that is prone to generate the gradually bright light source can be defined by a middle position in the image range IR that corresponds to the remote and nearby direction of travel of a mobile vehicle.

In particular, the image caption module 41 used in the present invention may have a function of recognizing a top covered zone feature (corresponding to the feature of interest of the "top covered zone" shown in Table 1). The top covered zone feature refers to obstructions appearing on tops of the multiple captured images (including the image range IR or the focusing zone FZ), and for the multiple captured images obtained according to the time sequence, the area of the obstructions appearing on the tops is not less than a predetermined area proportion of the area of the entire captured image. For example, the mobile vehicle is a car and the top covered zone feature corresponds to a site of a tunnel or an indoor parking lot. Preferably, in correspondence to the above-mentioned case that an obstruction appearing above the mobile vehicle driven by the driver is recognized, the focusing zone FZ may correspond to a zone (such as a position near the top) in the image range IR that the obstruction is prone to appear.

According to the foregoing, the image recognition system provided in the present invention mainly uses an image recognition method, which can be executed, for example, by a computer (corresponding to the image processing unit), and includes the following steps:

Step I: Receiving an captured image. The captured image is extracted by the above-mentioned image capture unit 1.

Step II: Executing an image processing flow to generate processed image information. The image processing flow includes step S31 and step S32 described above, and there is at least one of the additional step S31A and the additional step S31B between step S31 and step S32.

In other words, the image processing flow sequentially includes the following steps: acquiring at least one focusing zone image from a portion of the captured image (corresponding to step S31); optionally enlarging the focusing zone image (corresponding to the additional step S31A) and/or shrinking the captured image (corresponding to the additional step S31B); and making the focusing zone image and the captured image into a batch of image information to serve as the processed image information and outputting the same (corresponding to step S32).

Step III: Executing an image analysis procedure on the batch of image information/processed image information to generate an analysis result. The image analysis procedure is performed by using a trained image caption model (image caption module 41) and/or a trained object detection model (object detection module 42). Preferably, the image analysis procedure uses multiple batches of image information to generate the analysis result. In particular, the use of the multiple batches of image information is helpful for recognizing special scenes/situations (such as the aforementioned "lighting zone" and "top covered zone"), so as to achieve an effect of detailed recognition. The image caption model is configured to recognize whether the processed image information has an object and a relative position that conform to the classifications in the built-in features of interest thereof to output a corresponding analysis result (corresponding to the first recognition result). The object detection model is configured to recognize whether the processed image information has an object that conforms to the built-in features of the target object to be recognized thereof and coordinate information thereof, so as to output a corresponding recognition result (corresponding to the second recognition result). In a case that both the image caption model and the object detection model are used, the first recognition result and the second recognition result can be integrated into the aforementioned third recognition result. Preferably, the corresponding recognition results (the first, second, and third recognition results) can be converted into corresponding driving scene/driving situation captions based on a narrative logic.

Figure 4:
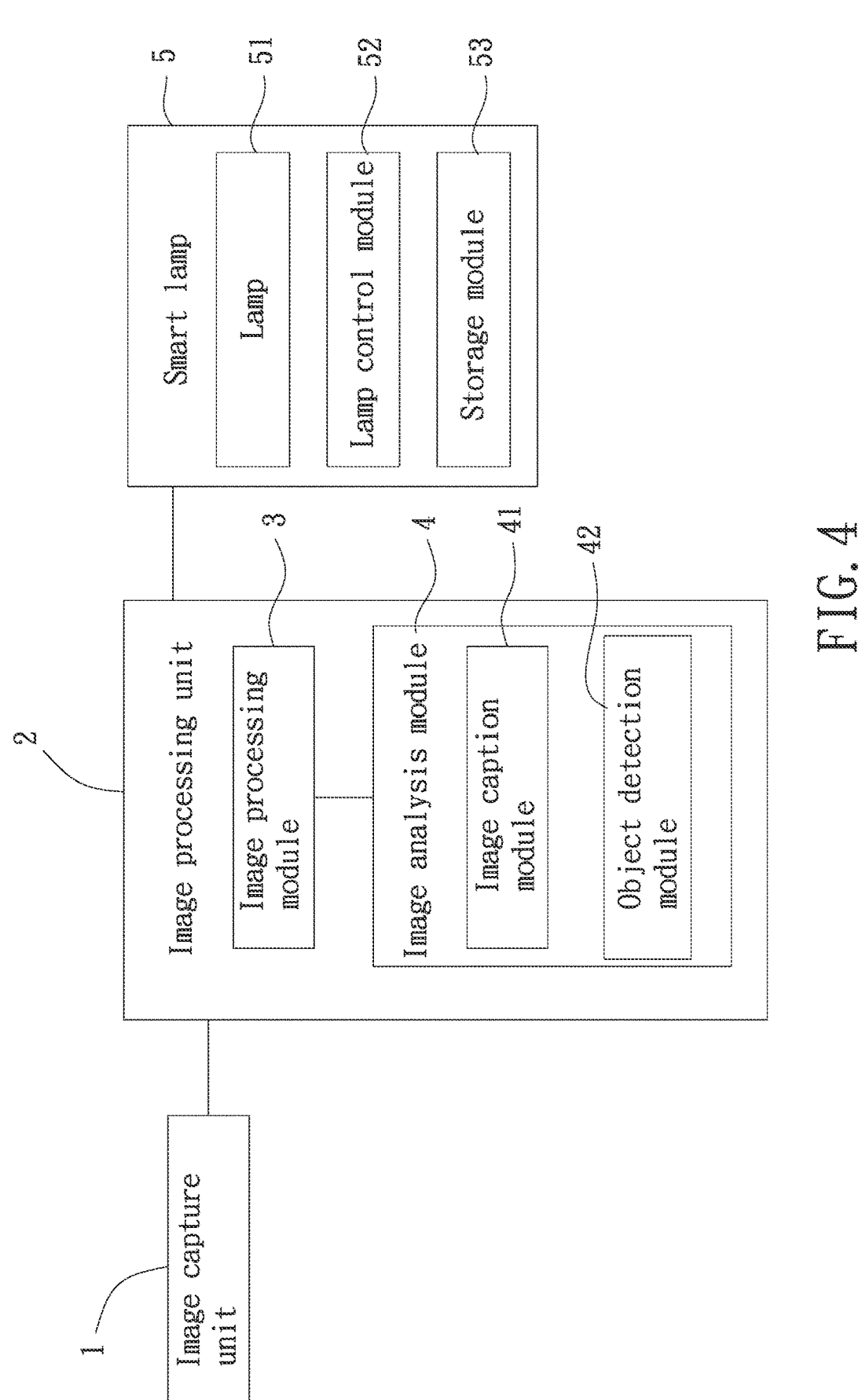
FIG. 4 is a system architecture diagram of a preferred embodiment of a smart lamp of the present invention.

Based on the above, the present invention further provides a smart lamp 5, which can be applied to mobile vehicles such as a motorbike, a car, a ship and an aircraft, and has a corresponding system architecture as shown in FIG. 4. The smart lamp 5 is equipped with a lamp 51 and a lamp control module 52. The lamp 51 has multiple switchable light modes. The light modes include an ON state or an OFF state of daytime running lights, dipped headlights, headlights on full beam and fog lights, but the light modes are not limited thereto. The lamp control module 52 has a pre-established lamp control logic. The lamp control module 52 is coupled with the image analysis module 4 to receive the features of interest recognized by the image analysis module 4 based on the above-mentioned image recognition method or system. In combination with the built-in lamp control logic, the state of a current light mode of the lamp of the mobile vehicle can be automatically adjusted/controlled. In detail, in the smart lamp 5, the image analysis procedure (image analysis module 4) in the image recognition method is performed by the image caption model (image caption module 41) and/or the object detection model (object detection module 42). The lamp control logic includes at least multiple determining conditions of at least one of all the objects, the relative position, the distance from the car body being driven, the site, the ambient lighting, the weather and the time in the features of interest. It should be noted that the lamp control logic of the smart lamp 5 is understandable to a person having ordinary skill in the art, and the general or universal features are thus omitted.

In particular, since the image recognition method of the present invention has a better recognition effect for the "lighting zone" and "top covered zone" in the features of interest, a corresponding smart lamp system (a system formed by integrating the above-mentioned image recognition system and the smart lamp 5) can generate corresponding lamp control instantly for a scene/situation in which the "lighting zone" and the "top covered zone" appear, so as to improve the driving safety of the mobile vehicle.

Taking the scene/situation that the mobile vehicle is a car as an example to illustrate the appearance of the lighting zone. In the conventional art, in a case that the ambient lighting is insufficient (dim or pitch-dark), driving on a curved mountain road (or other sight-limited environments), and the car turns on the headlights on full beam, when an opposing car approaches the car body being driven from a place where the vision is obstructed, a lighting zone generated by lamps/lights of the opposing car will be seen first. Then, as the lamps of the opposing car shows up from the vision obstruction, whether there is an oncoming car in the opposite direction can be recognized and determined based on the shown lamps in the conventional art. The lamps of the car body being driven is adjusted/controlled to be changed from the headlights on full beam to the dipped headlights. Therefore, a driver in the opposing car will be visually stimulated by the headlights on full beam, or even temporarily lose visual ability due to the strong light of the headlights on full beam, thereby endangering driving safety and increasing an accident risk. However, in the same scene/situation, in the present invention, due to the fact that the lighting zone can be recognized, it is possible to determine there is an oncoming car in advance (without waiting for the lamps of the opposing car to be shown from the vision obstruction), and thus, the headlights on full beam can be switched to the dipped headlights in advance, thereby guaranteeing that the driver of the opposing car will not be stimulated by the strong light of the headlights on full beam, and achieving the effect of improving the driving safety.

In particular, when the opposing car is relatively distant to make its lighting zone in the captured image relatively small, if the lighting zone appears in the focusing zone FZ aforementioned in the present invention, the features of the image in the focusing zone FZ can be recognized more easily and accurately by the image processing flow provided in the present invention, thereby enabling the above-mentioned control of the smart lamp 5, and achieving the effect of improving the driving safety.

In addition, taking a scene/situation that the mobile vehicle is a car as an example to illustrate the appearance of the top covered zone. In the conventional art, some of smart lamps determine the lighting level of a current site by using light sensing elements. If the light sensing element determines that lighting is sufficient, even if the car has already entered, for example, the top covered zone of a tunnel or a parking lot, there will be a problem that the car cannot automatically turn on the lamps. However, as for such a problem, the accuracy and sensitivity of determining of the top covered zone can be promoted by the recognition of the top covered zone feature in the present invention.

Furthermore, the smart lamp 5 may further have a learning mechanism. In at least one particular scene/situation in the lamp control logic, the corresponding predetermined lamp control logic can be automatically adjusted according to the habits of the user/driver. The learning mechanism is defined as: when the light mode manually adjusted by the driver in the particular scene/situation is different from a corresponding light mode in the lamp control logic, and when the consecutive manual adjustment to the same light mode reaches a particular number of times/learning times, the light mode in the lamp control logic corresponding to the particular scene/situation is replaced with the manually adjusted light mode. The particular number of times/learning times is at least once, preferably twice or above, and more preferably three to five times. The smart lamp 5 is further equipped with a storage module 53 coupled to the lamp control module 52. When the light mode manually adjusted by the user/driver in the particular scene/situation is different from the corresponding light mode in the lamp control logic, this condition will be recorded in the storage module 53 for the lamp control logic to determine whether the number of times of manual adjustment to the same light mode in the same particular scene/situation has reached the predetermined particular number of times/learning times.

The particular scenes/situations corresponding to the learning mechanism include three types as shown in Table 2 below.

TABLE 2

| Three Types of Particular Scenes/Situations Corresponding to Learning Mechanism. | | | |
| --- | --- | --- | --- |
| | Type I | Type II | Type III |
| Object | Any object | Any object | No object |
| Relative position | Left side or right side | Left side or right side | Unlimited |
| Distance | No more than 100 meters | More than 100 meters | Unlimited |
| Weather-Time | Thick fog-Unlimited Snow-Unlimited | Thick fog-Unlimited Snow-Unlimited Other weather-Night | Unlimited |

Figure 5:
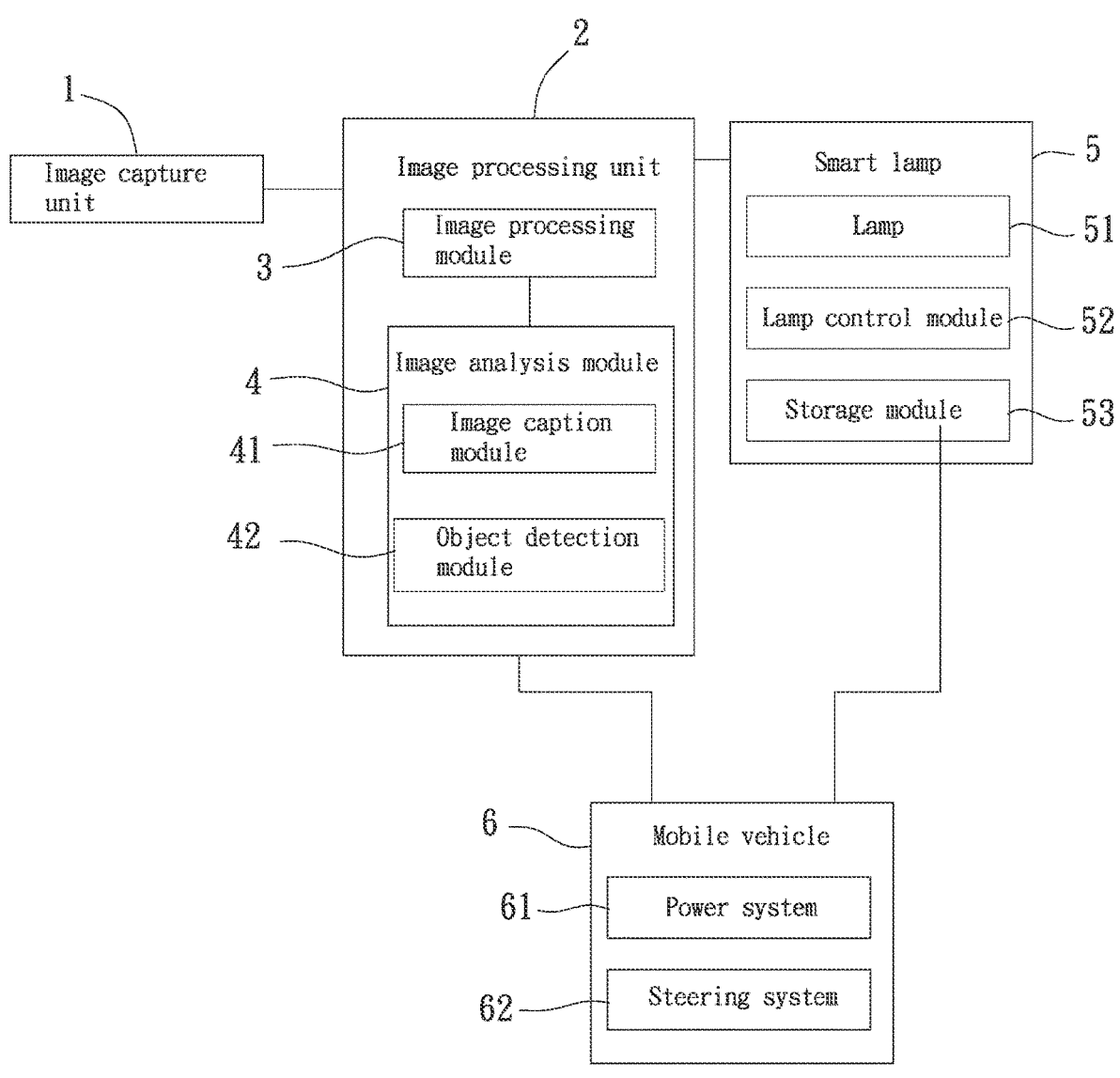
FIG. 5 is a system architecture diagram of a preferred embodiment of a mobile vehicle of the present invention.

Based on the foregoing, the present invention further provides a mobile vehicle 6, which has a corresponding system architecture as shown in FIG. 5. As mentioned above, the mobile vehicle 6 refers to a type of transportation, and is not limited to any carriers such as the land carrier, the underground carrier, the water surface carrier, the underwater carrier or the airborne carrier (which may be, for example, various cars, various boats or various aircrafts). The mobile vehicle 6 can be coupled to the above-mentioned image recognition system. As such, the corresponding driving scene/driving situation caption can be acquired instantly through the above-mentioned image recognition system/method. Alternatively, the smart lamp 5/lamp 51 is mounted on the mobile vehicle 6, preferably on the head side of the mobile vehicle 6 in the travel direction. Furthermore, the mobile vehicle 6 is equipped with a power system 61 and a steering system 62. The power system 61 is configured to drive the mobile vehicle 6, such that the mobile vehicle 6 generates corresponding motion. For example, the power system 61 includes at least a motor or an engine. The steering system 62 is configured to control the direction of motion of the mobile vehicle 6. The corresponding components and mechanisms in the power system 61 and steering system 62 vary depending on the type of mobile vehicle 6, and are understandable to person having ordinary skill in the art. The general or universal features thereof are thus omitted.

In summary, according to the image recognition method and system, the smart lamp and the mobile vehicle of the present invention, the focusing zone image is acquired for the zone that should be highly focused in the driving scene/driving situation, which helps to improve the recognition precision and/or recall rate of the features of interest/target object to be recognized in image recognition. In particular, it is possible to increase the recognition precision and/or recall rate of an recognizable feature in the focusing zone image by enlarging the image pixel dimension of the focusing zone image. Alternatively, in particular, the resolution of the focusing zone image can be still retained by only shrinking the image pixel dimension of the captured image, without reducing the recognition precision and/or recall rate of the recognizable feature in the focusing zone image. As such, it can be ensured that the resolution of the focusing zone image is not lower than the level of the original image resolution, which in turn can improve or ensure better recognition precision and/or recall rate of the recognizable feature. In addition, a more accurate driving scene/driving situation caption can be formed by applying both the image caption model and the object detection model, in combination with the recognized object, the relative position of each recognized object, and the distance between each recognized object and the vehicle body being driven. Furthermore, the features of the "lighting zone" and the "top covered zone" can be clearly defined and accurately recognized by applying the preset recognition rules/mechanisms for recognizing the "lighting zone" and the "top covered zone" from multiple successive images in the image caption model. Moreover, by combining the above-mentioned image recognition system with the smart lamp, the smart lamp can make more accurate lamp control correspondingly according to the more accurately recognized driving scene/driving situation, thereby improving the driving safety and convenience. In addition, the smart lamp has the corresponding learning mechanism, and thus, it is possible to control switching of the lamp according to the habits of the driver in the particular scene/situation. Furthermore, the above-mentioned image recognition system is combined with the mobile vehicle, which helps improve the control of the driver over the driving scene/driving situation. Moreover, by combining the above-mentioned smart lamp with the mobile vehicle, and by making corresponding lamp control over the smart lamp according to the driving scene/driving situation, the driving safety and convenience are improved.

Although the invention has been described in detail with reference to its presently preferable embodiments, it will be understood by one of ordinary skill in the art that various modifications can be made without departing from the spirit and the scope of the invention, as set forth in the appended claims. Further, if the above-mentioned several embodiments can be combined, the present invention includes any implementation aspects of combinations thereof.

What is claimed is:

1. An image recognition method comprising the following steps:
   receiving a captured image;
   acquiring a focusing zone image from a portion of the captured image;
   processing the captured image and the focusing zone image, and then making the two images into a batch of image information; and
   executing an image analysis procedure on the batch of image information to generate an analysis result;
   wherein, in the image analysis procedure, the captured image and the focusing zone image of the batch of image information are respectively analyzed to get a respective analyzed result, and then the respective analyzed result from the captured image and the respective analyzed result from the focusing zone image are combined to generate the analysis result.

2. The image recognition method as claimed in claim 1, wherein the image analysis procedure is performed by using both or one of an image caption model and an object detection model.

3. The image recognition method as claimed in claim 2, wherein in a state that the image analysis procedure is performed by using the image caption model, multiple batches of image information are analyzed to generate the analysis result.

4. The image recognition method as claimed in claim 3, wherein an original image pixel dimension of the focusing zone image is 10 to 50 percent of an original image pixel dimension of the captured image.

5. The image recognition method as claimed in claim 1, wherein an original image pixel dimension of the focusing zone image is 10 to 50 percent of an original image pixel dimension of the captured image.

6. The image recognition method as claimed in claim 1, wherein the resolution of the focusing zone image is the same with the resolution of the captured image.

7. An image recognition system comprising:
   an image capture unit configured to capture a captured image; and
   an image processing unit configured to perform the following operations:
      acquiring a focusing zone image from a portion of the captured image;
      processing the captured image and the focusing zone image, and then making the two images into a batch of image information; and
      executing an image analysis procedure on the batch of image information to generate an analysis result;
      wherein, in the image analysis procedure, the captured image and the focusing zone image of the batch of image information are respectively analyzed to get a respective analyzed result, and then the respective analyzed result from the captured image and the respective analyzed result from the focusing zone image are combined to generate the analysis result.

8. The image recognition system as claimed in claim 7, wherein the resolution of the focusing zone image is the same with the resolution of the captured image.

9. A mobile vehicle comprising:
   an image capture unit configured to capture a captured image;
   an image processing unit configured to perform the following operations:
      acquiring a focusing zone image from a portion of the at least one captured image;
      processing the at least one captured image and the focusing zone image, and then making the two images into a batch of image information; and
      executing an image analysis procedure on the batch of image information to generate an analysis result;
      wherein in the image analysis procedure, the captured image and the focusing zone image of the batch of image information are respectively analyzed to get a respective analyzed result, and the respective analyzed result from the captured image and the respective analyzed result from the focusing zone image are combined to generate the analysis result;
   a lamp having multiple switchable light modes;
   a lamp control module configured to receive the analysis result, wherein the lamp control module has a lamp control logic to switch the multiple switchable light modes according to the analysis result; and
   a power system configured to drive the mobile vehicle.

10. The mobile vehicle as claimed in claim 9, wherein the lamp control logic further includes a learning mechanism, which automatically adjusts the lamp control logic according to habits of a user.

11. The mobile vehicle as claimed in claim 10, wherein the learning mechanism includes: when a light mode manually adjusted by the user in a particular scene or situation is different from a corresponding light mode in the lamp control logic, and when a consecutive manual adjustment to the same light mode reaches a particular number of times, the light mode in the lamp control logic corresponding to the particular scene or situation is replaced with the light mode manually adjusted by the user.

12. The mobile vehicle as claimed in claim 9, wherein the mobile vehicle is any of a car, a boat and an aircraft.

13. The mobile vehicle as claimed in claim 9, wherein the resolution of the focusing zone image is the same with the resolution of the captured image.

* * * * *